(12) United States Patent
Powell

(10) Patent No.: US 9,694,637 B2
(45) Date of Patent: Jul. 4, 2017

(54) FLEXIBLE JOINT FOR A SUSPENSION LINK WITH A THREADED INSERT

(71) Applicant: Douglas H. Powell, Eldorado Hills, CA (US)

(72) Inventor: Douglas H. Powell, Eldorado Hills, CA (US)

( * ) Notice: Subject to any disclaimer, the term of this patent is extended or adjusted under 35 U.S.C. 154(b) by 268 days.

(21) Appl. No.: 14/622,350

(22) Filed: Feb. 13, 2015

(65) Prior Publication Data
US 2016/0238061 A1 Aug. 18, 2016

(51) Int. Cl.
| F16B 7/06 | (2006.01) |
|---|---|
| F16G 11/12 | (2006.01) |
| B60G 7/00 | (2006.01) |
| F16C 11/08 | (2006.01) |
| F16C 11/06 | (2006.01) |
| F16F 1/38 | (2006.01) |
| F16C 7/06 | (2006.01) |

(52) U.S. Cl.
CPC ............ *B60G 7/001* (2013.01); *B60G 7/005* (2013.01); *F16C 11/0614* (2013.01); *F16C 11/083* (2013.01); *F16F 1/38* (2013.01); *B60G 2204/416* (2013.01); *B60G 2206/1112* (2013.01); *F16C 7/06* (2013.01); *F16C 2326/05* (2013.01); *Y10T 403/295* (2015.01)

(58) Field of Classification Search
CPC .. B60G 7/001; B60G 7/005; B60G 2204/416; B60G 2206/1112; F16C 11/0614; F16C 11/083; F16C 2326/05; F16C 7/06; F16F 1/38; Y10T 403/295
USPC .......... 403/33, 44, 46, 374.3; 74/89.37, 586, 74/579 R
See application file for complete search history.

(56) References Cited

U.S. PATENT DOCUMENTS

| RE31,013 | E | * | 8/1982 | Smith, Jr. | ................ | B62D 7/20 |
|---|---|---|---|---|---|---|
| | | | | | | 280/93.507 |
| 5,603,583 | A | * | 2/1997 | Jackson | ................ | B60G 7/005 |
| | | | | | | 280/93.51 |
| 5,765,957 | A | * | 6/1998 | Connell | .................... | F16C 7/06 |
| | | | | | | 403/44 |
| 6,074,125 | A | * | 6/2000 | Krawczak | ................ | B62D 7/20 |
| | | | | | | 280/93.51 |

(Continued)

*Primary Examiner* — Gregory Binda
*Assistant Examiner* — Nahid Amiri
(74) *Attorney, Agent, or Firm* — Dodd Call Black, PLLC; Dustin L. Call

(57) ABSTRACT

A flexible joint for attachment to a suspension link. The flexible joint includes a housing, where the housing includes an external surface and an internal surface. The flexible joint also includes a joint insert. The joint insert includes a first section and a second section attached to the first section at an attachment point. The joint insert also includes an inner sleeve, where the inner sleeve includes a first portion in the first section of the joint insert and a second portion in the second section of the joint insert. The inner sleeve also includes a channel, where the channel is configured to receive at least a portion of an external device and an external surface. The joint insert further includes an elastomer, where the elastomer is fused to at least a portion of the external surface of the inner sleeve, a portion of the elastomer is in contact with the internal surface of the housing, and the elastomer is not permanently attached to the internal surface.

13 Claims, 6 Drawing Sheets

(56) References Cited

U.S. PATENT DOCUMENTS

| | | | | |
|---|---|---|---|---|
| 7,185,556 B2* | 3/2007 | Beattie | ................... | B60G 7/003 |
| | | | | 29/516 |
| 7,306,393 B2* | 12/2007 | Erdogan | ................ | B60G 7/005 |
| | | | | 403/133 |
| 8,038,162 B2* | 10/2011 | Knopp | ................... | B60G 7/005 |
| | | | | 280/124.106 |
| 8,708,594 B2* | 4/2014 | Brunneke | .............. | B60G 7/005 |
| | | | | 280/124.11 |
| 8,783,702 B2* | 7/2014 | Lee | .......................... | B60G 7/02 |
| | | | | 280/124.134 |
| 2002/0018692 A1* | 2/2002 | Oliveira | ................... | B62D 7/16 |
| | | | | 403/135 |
| 2005/0029768 A1* | 2/2005 | McLaughlin | .......... | B60G 7/003 |
| | | | | 280/124.11 |
| 2011/0033227 A1* | 2/2011 | Kwon | ............... | B29C 45/14491 |
| | | | | 403/135 |
| 2012/0255395 A1* | 10/2012 | Sugawara | ............. | F16F 1/3849 |
| | | | | 74/579 R |
| 2013/0199332 A1* | 8/2013 | Powell | .................. | F16C 11/083 |
| | | | | 74/579 R |
| 2015/0050122 A1* | 2/2015 | Gutta | ........................ | F16B 7/06 |
| | | | | 415/12 |
| 2015/0224916 A1* | 8/2015 | Wandelt | .................. | F16B 35/04 |
| | | | | 362/523 |

\* cited by examiner

FLEXIBLE JOINT FOR A SUSPENSION LINK WITH A THREADED INSERT

CROSS-REFERENCE TO RELATED APPLICATIONS

Not applicable.

BACKGROUND OF THE INVENTION

Suspension links are a primary component of a vehicle suspension. For example, they can hold the axle of the vehicle in the proper position and prevent the axle housing from spinning when torque is applied to the axle. The connection of the suspension link to the vehicle frame and axle can help provide a proper "feel" in the ride of the vehicle, as the connection affects what motion is felt by the vehicle passengers. In addition, the correct operation, mounting geometry and end connection of the suspension link improves the performance of the vehicle over differing terrains and speeds.

However, there are a number of drawbacks in current joints which connect the suspension link to the vehicle frame. In particular, the orientation and position of the axle relative to the frame can be changing while the vehicle is being driven. While the changes may be minimal, the movement may, over time, cause wear within the joint. Wear in the joints can cause vehicle performance degradation, noisy or squeaky joints, vehicle vibration, a poor ride quality and steering challenges In addition, debris can enter the joint over time. This debris acts as an abrasive agent within the joint. I.e., over time, the movement of the debris relative to the parts of the joint increases the rate at which wear occurs within the joint. This leads to the inclusion of more debris and to more space in which debris can be trapped, further increasing the wear rate of the joint.

This wear can be removed by flexibly fusing the articulating parts of the joint to one another. Flexibly fusing the articulating components stops movement of the parts relative to one another and can help prevent debris from entering the joint. However, doing so results in an excessive amount of stress on the flexible materials associated with the fusing and reduces the amount of rotation that can be absorbed by the joint. I.e., it becomes more likely that changes in the orientation or position of the suspension link relative to the frame will break down and/or damage the elastomeric properties of the flexible portions of the joint, likely resulting in joint failure.

Accordingly, there is a need in the art for a joint which can resist wear at the appropriate locations. In addition, there is a need in the art for a joint which can resist the accumulation of debris and articulating wear. Further, there is a need in the art for a joint which can allow normal changes in position and orientation of the suspension link relative to the frame without damage to elastomeric properties of the flexible components.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a flexible joint for attachment to a suspension link. The flexible joint includes a housing, where the housing includes an external surface and an internal surface. The flexible joint also includes a joint insert. The joint insert includes a first section and a second section attached to the first section at an attachment point. The joint insert also includes an inner sleeve, where the inner sleeve includes a first portion in the first section of the joint insert and a second portion in the second section of the joint insert. The inner sleeve also includes a channel, where the channel is configured to receive at least a portion of an external device and an external surface. The joint insert further includes an elastomer, where the elastomer is fused to at least a portion of the external surface of the inner sleeve, a portion of the elastomer is in contact with the internal surface of the housing, and the elastomer is not permanently attached to the internal surface.

Another example embodiment includes a suspension link. The suspension link includes body and a flexible joint. The flexible joint includes a housing, where the housing includes an external surface, an internal surface, the internal surface forming a cavity, and a flange on the internal surface. The flexible joint also includes a joint insert configured to be inserted in the housing. The joint insert includes a first section and a second section attached to the first section at an attachment point. The joint insert also includes an inner sleeve, where the inner sleeve includes a first portion in the first section of the joint insert and a second portion in the second section of the joint insert. The inner sleeve also includes a channel, where the channel is configured to receive at least a portion of an external device and an external surface. The joint insert further includes an elastomer, where the elastomer includes a groove which is complimentary to the flange of the inner surface of the housing, the elastomer is permanently attached to at least a portion of the external surface of the inner sleeve, a portion of the elastomer is in contact with the internal surface of the housing, and the elastomer is not permanently attached to the internal surface.

Another example embodiment includes a suspension link. The suspension link includes body and a flexible joint. The flexible joint includes a housing, where the housing includes an external surface, an internal surface, the internal surface forming a cavity, and a flange on the internal surface. The flexible joint also an attachment, where the attachment is connected to the external surface of the housing and is configured to affix the flexible joint to the body. The flexible joint moreover includes a joint insert configured to be inserted in the housing. The joint insert includes a first section and a second section attached to the first section at an attachment point. The joint insert moreover includes a threaded connection attaching the second section to the first section and a screw drive for rotating the second section relative to the first section via the threaded connection. The joint insert also includes an inner sleeve, where the inner sleeve includes a first portion in the first section of the joint insert and a second portion in the second section of the joint insert. The inner sleeve also includes a channel, where the channel is configured to receive at least a portion of an external device and an external surface. The joint insert further includes an elastomer, where the elastomer includes a groove which is complimentary to the flange of the inner surface of the housing, the elastomer is permanently attached to at least a portion of the external surface of the inner sleeve, a portion of the elastomer is in contact with the internal surface of the housing, and the elastomer is not permanently attached to the internal surface.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
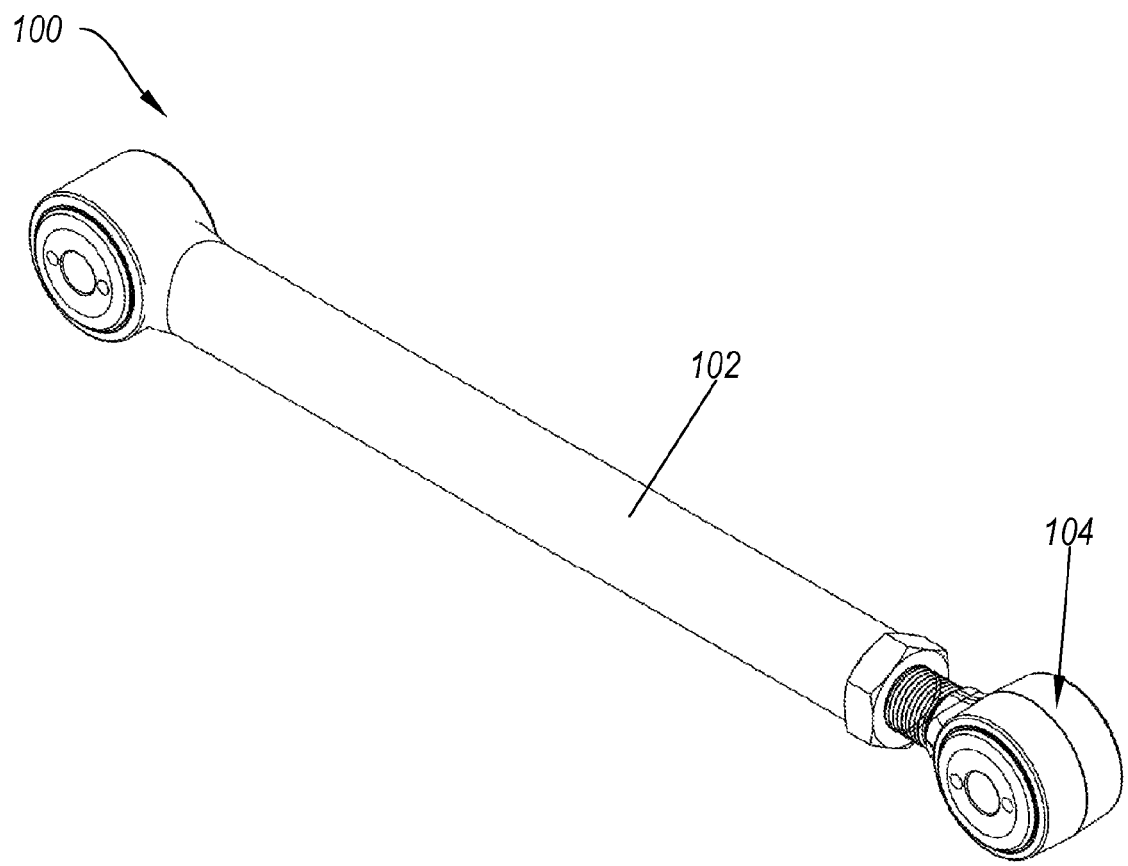
FIG. 1A illustrates an example of an assembled suspension link used in a vehicle suspension.
Figure 1B:
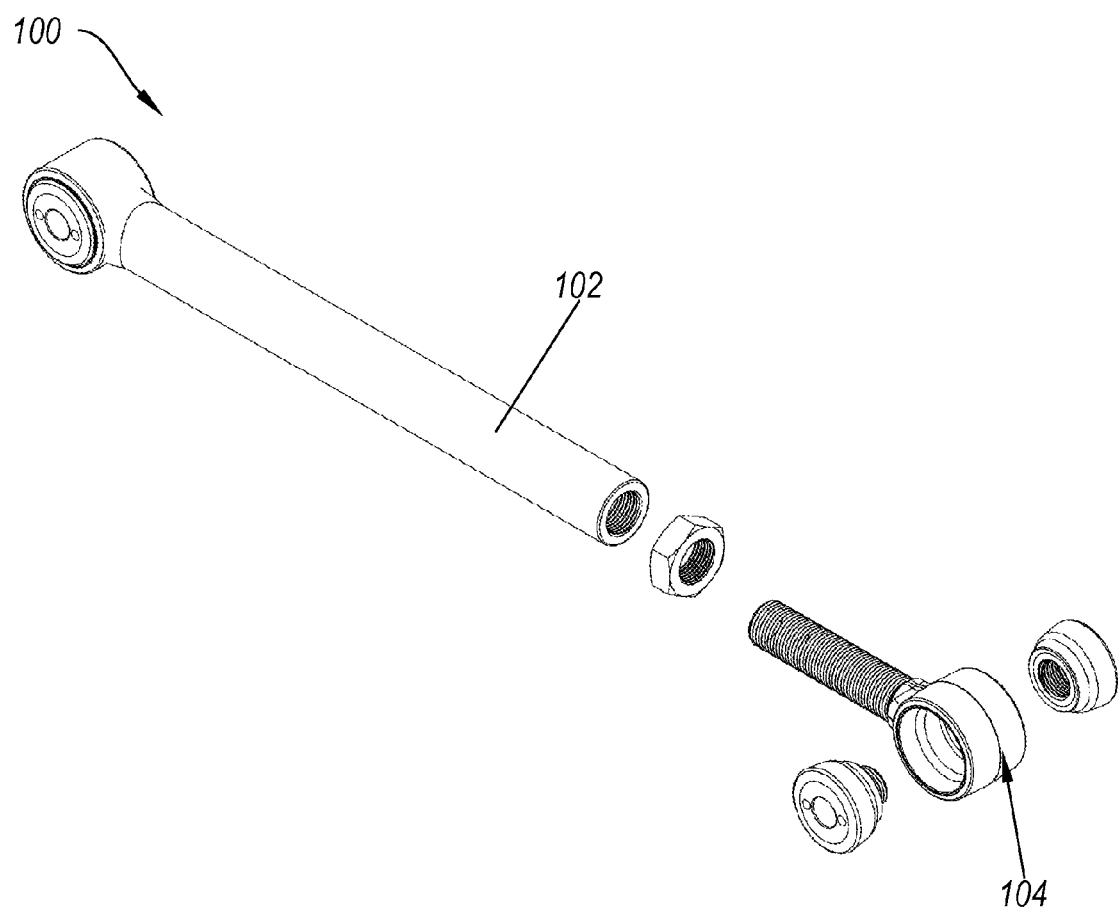
FIG. 1B illustrates an example of an exploded view of a suspension link used in a vehicle suspension.

FIGS. 1A and 1B (collectively "FIG. 1") illustrate an example of a suspension link 100 used in a vehicle suspension. FIG. 1A illustrates an example of an assembled suspension link 100 used in a vehicle suspension; and FIG. 1B illustrates an exploded view of an example of a suspension link 100 used in a vehicle suspension. The suspension link 100 can include any device for connecting two parts of a vehicle to one another when the two parts may be changing position relative to one another, but the distance between the parts should remain constant. For example, the suspension link 100 can include a control arm, a track bar, a drag link or a tie rod. E.g., a set of suspension links 100 can be suspended between a vehicle axle and a vehicle frame in such a way as to prevent axial rotation of the axle housing while still allowing vertical articulation of the axle housing. I.e., a portion of the axle will tend to rotate under the torque created by the motor. However, if the housing of the axle is attached to the frame of the vehicle via properly configured suspension links 100 the torque of the motor will not rotate the axle housing.

FIG. 1 shows that the suspension link 100 can include a body 102. The body 102 is the main portion of the suspension link 100. For example, if the suspension link 100 is used in conjunction with a vehicle axle the body 102 can connect the vehicle frame with the axle. In particular, on each side of the axle, suspension links 100 can be placed opposite one another on the axles and connect the axle to the frame. The body 102 can be straight or can include one or more bends, allowing the suspension link to connect the axle and the frame while avoiding other vehicle components.

FIG. 1 also shows that the suspension link 100 can include a joint 104. The joint 104 can be used to attach the suspension link 100 to an external device. For example, the joint 104 can be used to attach the suspension link 100 to a vehicle suspension or vehicle frame. In particular, the joint 104 can allow the axle and the frame to move relative to one another in a desired direction and prevent movement in an undesired direction. One of skill in the art will appreciate that the joint 104 can be attached to any desired external device and that a suspension and vehicle frame are an exemplary use, unless otherwise specified in the claims.

Figure 2A:
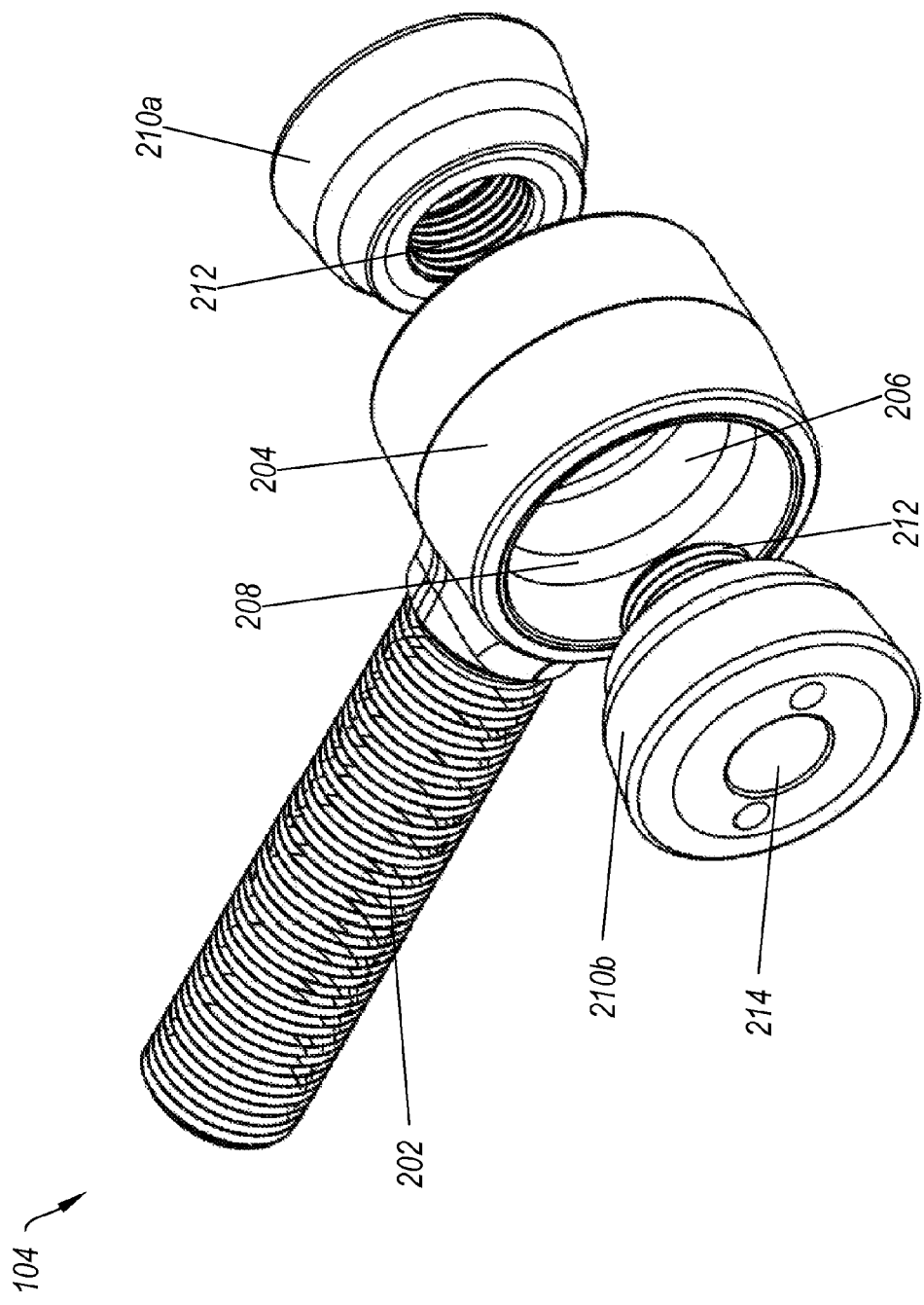
FIG. 2A illustrates a perspective view of the example of a joint.
Figure 2B:
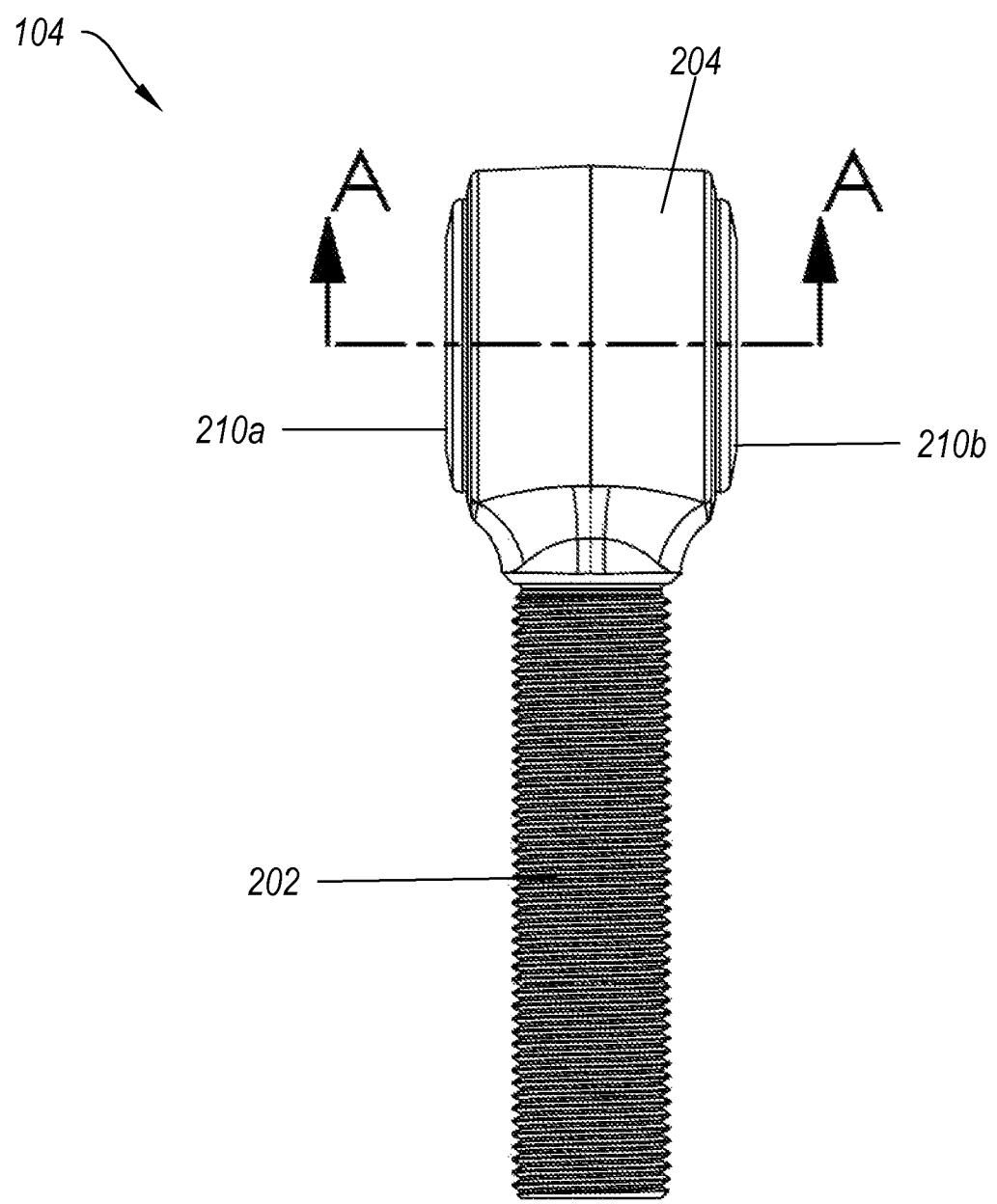
FIG. 2B illustrates a side view of the example of the joint.
Figure 2C:
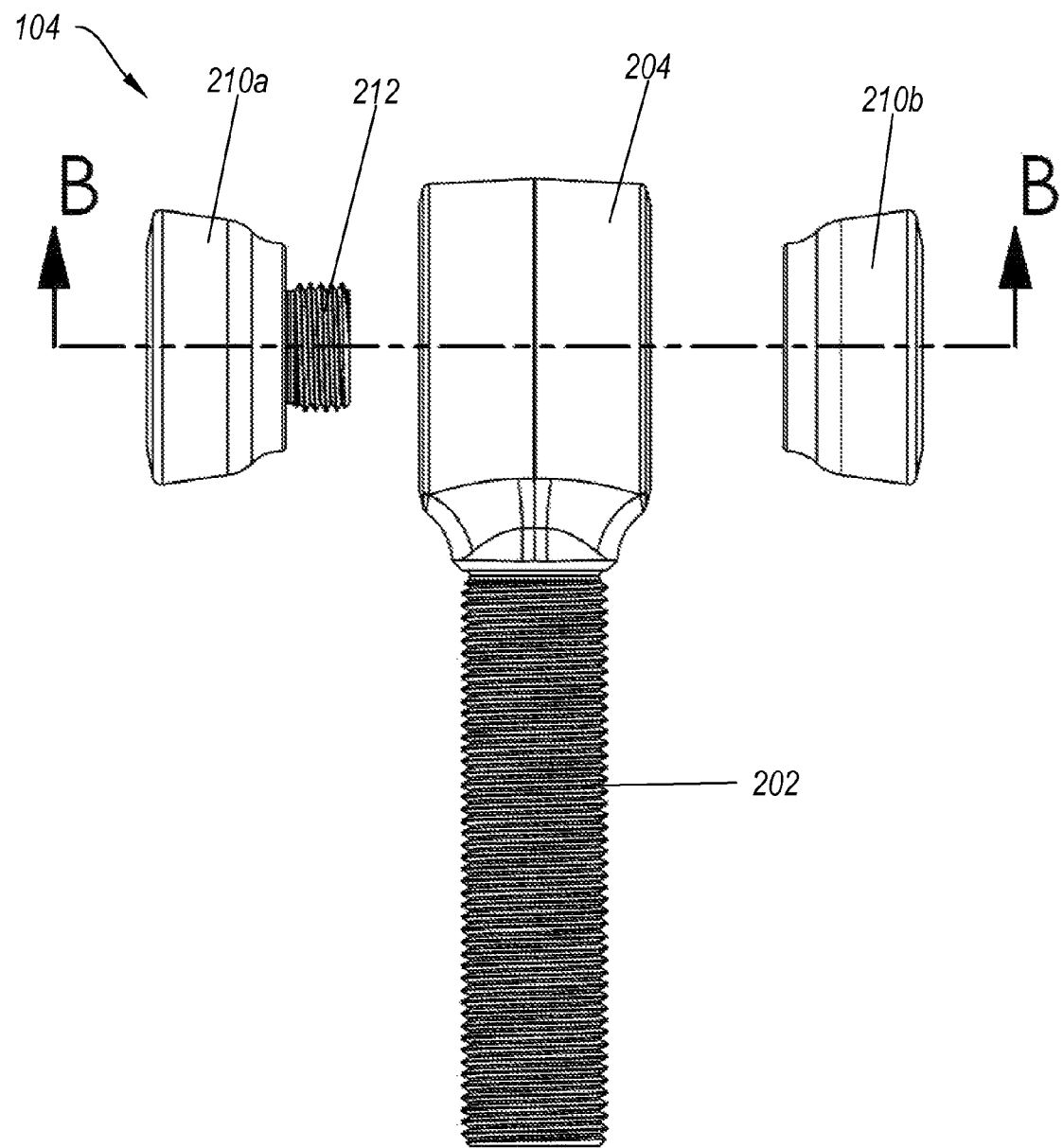
FIG. 2C illustrates an exploded side view of the example of the joint.

FIGS. 2A, 2B and 2C (collectively "FIG. 2") illustrate an example of a joint 104. FIG. 2A illustrates a perspective view of the example of a joint 104; FIG. 2B illustrates a side view of the example of the joint 104; and FIG. 2C illustrates an exploded side view of the example of the joint 104. The joint 104 can allow some rotation in the joint 104 without sustaining damage. In particular, the joint 104 eliminates excessive wear during normal use. Additionally or alternatively, the joint 104 can be secured against debris which can cause frictional wear inside the joint 104.

FIG. 2 show that the joint 104 can include an attachment 202. The attachment 202 can connect the joint 104 to a suspension link. One of skill in the art will appreciate that a suspension link as used herein is exemplary and that the joint 104 can be used with any device, unless otherwise specified in the claims. The attachment 202 can included a threaded screw or any other desired attachment mechanism.

FIG. 2 also show that the joint 104 can include a housing 204. The housing 204 can retain other portions of the joint 204. I.e., the housing 204 can ensure that the other parts of the joint 104 maintain a proper spatial relationship to one another. Additionally or alternatively, the housing 204 can protect the other portions of the joint 104. I.e., the housing 204 can prevent dust or other debris from damaging other portions of the joint 104.

FIG. 2 further show that the housing 204 can include a cavity 206. The cavity 206 can allow the joint 104 to connect to an external device, as described below. In particular, the cavity can include an open cylinder or hole which is configured to allow for a connection to an external device. The cavity 206 can include an axis or line formed by the centers of the bases of a cavity 206 (i.e., the axis would be parallel to line A-A of FIG. 2B or line B-B of FIG. 2C). The axis of the cavity 204 can be perpendicular to the axis of the attachment 202 or can form some other angle with the axis of the attachment 202.

FIG. 2 additionally shows that the cavity 206 can include a flange 208 or projection. The flange 208 can provide a mechanism for retaining or orienting the other portions of the joint 104. In particular, the flange 208 means that the mating between the cavity 206 and the other portions of the joint 104 are restricted in one or more axes, preventing movement of the other portions of the joint 104 relative to the cavity 206 and/or locking the orientation of the other portions of the joint 104 relative to the cavity 206.

FIG. 2 further shows that the joint 104 can include a first insert 210a and a second insert 210b (collectively "insert 210"). The insert 210 can be placed within the cavity 206. The insert 210 can allow a connected external device to move relative to the axis of the housing 204, as described below. In particular, the insert 210 can allow the external device to rotate while remaining attached to the joint 104 and without damaging the joint 104. The insert 210 have an outer portion with a cross-sectional area which is larger than the cross-sectional area of the inner portion. For example, the insert 210 can form an hour glass shape when secured to one another, as described below. That is the insert 210, when assembled, can have a groove which matches the flange 208. Thus, the flange 208 prevents either the first insert 210a or the second insert 210b from penetrating past the flange 208. I.e., the first insert 210a and the second insert 210b must be attached within the housing or they collectively will not be able to be placed within the cavity 206.

FIG. 2 additionally shows that the insert 210 can included a threaded connection 212. The threaded connection 212 can secure the first insert 210a and the second portion 208b to one another. Addition, the threaded connection 212 preloads the joint 104 and reduces the total number of components. I.e., the threaded connection 212 means that washers, retaining rings, threaded washers, etc. are not required to retain the insert within the housing 204. The inner portion of the first insert 210a and the second insert 210b when joined via the threaded connection 212 match the flange 208 within the cavity 206 of the housing 204, preventing lateral movement of the insert 210 relative to the housing 204. I.e. the inner portion of the insert 210 is complementary to the flange 208.

FIG. 2 moreover shows that the joint 104 can include a screw drive 214. The screw drive 214 allows a user to put torque on the second insert 210b relative to the first insert 210a. I.e., the screw drive 214 allows the threaded connection 212 to be tightened or loosened by a user. That is, the screw drive 214 accepts a driver with a complementary head to either tighten or loosen the threaded connection 212. Tightening the threaded connection 212 increases the compression of the elastomer (since the inner portion of the insert 210 has a smaller cross-section than the outer portion of the insert 210). The screw drive 214 can include any desired type, such as, but not limited to, Phillips head, hex, socket, Torx, spanner head (snake-eye) or any other driver type.

Figure 3A:
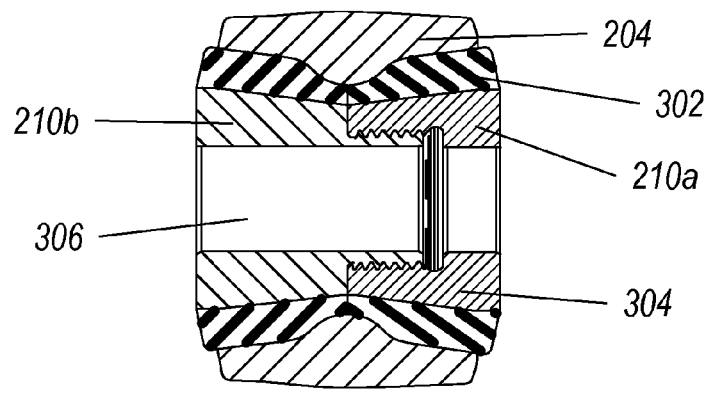
FIG. 3A illustrates a cross-section of a housing and insert along line A-A of FIG. 2B.
Figure 3B:
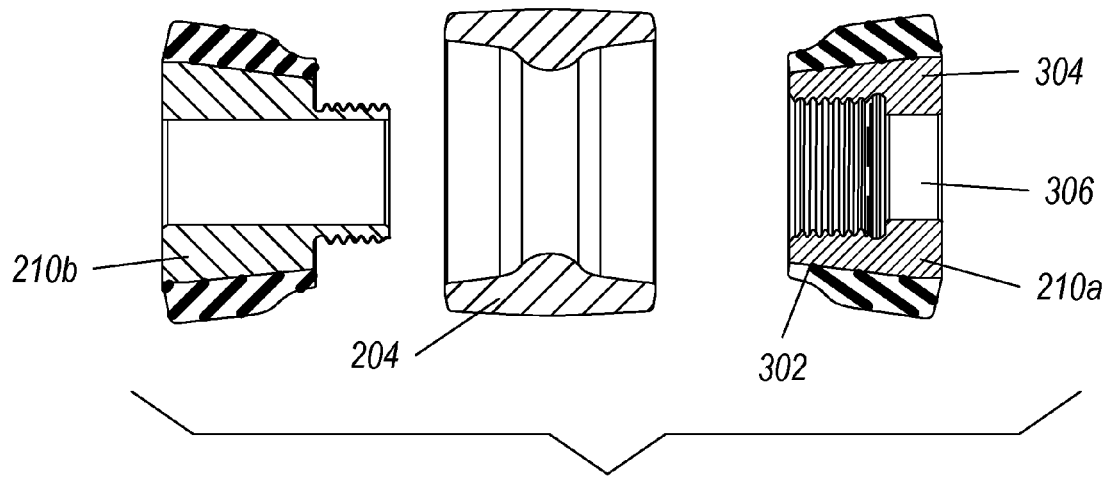
FIG. 3B illustrates a cross-section of a housing and insert along line B-B of FIG. 2C.

FIGS. 3A and 3B (collectively "FIG. 3") illustrate a cross-section of a housing 204 and insert 210. FIG. 3A illustrates a cross-section of a housing 204 and insert 210 along line A-A of FIG. 2B; and FIG. 3B illustrates a cross-section of a housing 204 and insert 210 along line B-B of FIG. 2C. The axis of the insert 210 can tilt relative to the axis of the housing 204. I.e., the ends of the insert 210 can move relative to the housing 204. For example, the axis of the insert 210 may be able to tilt up to 17 degrees relative to axis of the housing 204 without any loss of functionality. Additionally or alternatively, the insert 210 can move laterally within the housing 204. For example, the insert 210 can move vertically as shown in FIG. 3 (also illustrated in FIG. 12) or into and out of the plane of FIG. 3. Additionally or alternatively, the insert 210 may be able to rotate within the housing 204. I.e., the insert 210 can rotate about its axis within the housing 204.

FIG. 3 shows that the insert 210 can include an elastomer 302. The elastomer 302 can resist movement of the external device, as described below. For example, the elastomer 302 can include rubber, a polymer or any other desired material. The elastomer 302 is not attached to the housing 204. I.e., the insert 210 may be placed within, and interact with, the housing 204 but is not permanently attached to the housing 204. A lack of permanent attachment can mean that the housing 204 and the insert 210 are in contact with one another, but not affixed to one another. I.e., friction can prevent motion of the insert 210 relative to the housing 204. One of skill in the art will appreciate that the lack of a permanent attachment can allow a greater degree of movement in the external device without a loss of appropriate resistance. In particular, a permanent attachment prevents rotation within the housing 204 but additionally causes extreme stress on the elastomer 302. In contrast, a lack of a permanent attachment can allow a degree of rotation, as described below.

FIG. 3 also shows that the insert 210 can include an inner sleeve 304 (comprised of a first portion from the first insert 210a and a second portion from the second insert 210b). The inner sleeve is fused to the elastomer 302. I.e., there is a permanent connection, through bonding, casting, adhesive or any other desired attachment method, between the inner sleeve 304 and the elastomer 302. The permanent attachment allows the elastomer 302 to resist movement of the inner sleeve 304, as described below. In addition, the permanent attachment reduces wear at the interaction between the elastomer 302 and the inner sleeve 304.

FIG. 3 further shows that the inner sleeve 304 can include a channel 306. The channel 306 can receive at least a portion of the external device. For example, the channel 306 can receive a bolt, a shaft or another portion of the external device. I.e., the channel 306 can include an attachment mechanism that allows the external device to affix to the channel 306. For example, the channel 306 can be threaded, include flanges or can be any other desired shape for receiving the external device. The channel 306 can pass entirely through the inner sleeve 304 or partially through the inner sleeve 304, as desired.

One of skill in the art will appreciate that the elastomer 302 allows torque perpendicular to the axis of the housing 204 to cause the inner sleeve 304 to rotate relative to the housing 204 perpendicular to the axis of the housing 204. That is, the axis of the insert 210 is "tilted" relative to the axis of the housing 204 under torque. Consequently, the inner sleeve 304 rotates within the housing 204. In particular, the inner sleeve 304 has rotated along an axis perpendicular to the axis of the inner sleeve 304. I.e., one or both ends of the inner sleeve 304 can be moved relative to the center point of the inner sleeve 304. The torque is resisted by the elastomer 302. The elastomer 302 can deform where it is permanently attached to the inner sleeve 304 but have little or no deformation where it is in contact with the housing 204. One of skill in the art will appreciate that the difference in movement is force that is stored within the elastomer 302 as potential energy. As the torque on the external device is removed, the force within the elastomer 302 is released, centering the inner sleeve 304 within the elastomer 302.

One of skill in the art will appreciate that the elastomer 302 can allow for movement other than rotation of the inner sleeve 304. For example, the elastomer 302 can allow lateral motion parallel to the axis of the inner sleeve 304. I.e., the elastomer 302 on one side of the inner sleeve 304 can be compressed while the opposing side of the elastomer 302 expands. E.g., the elastomer 302 on the first insert 210a can be compressed while the elastomer 302 on the second insert 210b expands (since the native state of the elastomer—without any external forces—is slightly compressed).

Likewise, micro-rotation of the inner sleeve about the axis of the cavity 206 can cause the inner sleeve 304 to rotate relative to the housing 204 without moving the axis of the insert 210. That is, the axis of the insert 210 is not "tilted" relative to the axis of the cavity 206. In particular, the torque can rotate the inner sleeve 304 without imparting the torque to the housing 204, as described below.

Further, macro rotation of the inner sleeve about the axis of the cavity 206 (the torque of FIG. 10 is increased beyond the ability of friction between the elastomer 302 and the housing 204 to prevent movement at the junction between the elastomer 302 and the housing 204) causes the elastomer 302 to "slip" relative to the housing 204. I.e., the attachment between the elastomer 302 and the housing 204 is not permanent, but a product of the friction at the interface between the elastomer 302 and housing 204. As the torque on the inner sleeve 304 becomes sufficient to overcome the friction the elastomer 302 can rotate relative to the housing 204.

Finally lateral force perpendicular to the axis of the inner sleeve 304 can cause the inner sleeve 304 to move laterally relative to the axis of the housing 204. That is, the external device 902 does not rotate the inner sleeve 304, but rather provides a lateral force in the inner sleeve, "pushing" the inner sleeve 304 into the elastomer 302 compresses the elastomer on one side and expanding the elastomer 302 on the opposing side. That is, as the inner sleeve 304 moves relative to the housing 204 the elastomer 302 expands or contracts to dampen the movement but the axis of the inner sleeve 304 and the housing 204 remain parallel to one another. When the lateral movement is sufficient, the lateral motion is transmitted through the elastomer 302 to the housing 204. In contrast, when the lateral movement is minor, the lateral movement is dampened by the elastomer 302.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A suspension link, the suspension link comprising:
   a body;
   a flexible joint, wherein the flexible joint includes:
      a housing, wherein the housing includes:
         an external surface;
         an internal surface, the internal surface forming a cavity; and
         a flange on the internal surface; and
      an attachment, wherein the attachment:
         is connected to the external surface of the housing; and
         is configured to affix the flexible joint to the body; and
      a joint insert, wherein the joint insert:
         is configured to be inserted in the housing; and
         includes:
            a first insert;
            a second insert attached to the first insert at an attachment point;
            a threaded connection attaching the second insert to the first insert;
            a screw drive for rotating the second insert relative to the first insert via the threaded connection;
            an inner sleeve, wherein the inner sleeve includes:
               a first portion in the first insert of the joint insert;
               a second portion in the second insert of the joint insert;
               a channel, wherein the channel is configured to receive at least a portion of an external device; and
               an external surface;
            an elastomer, wherein:
               the elastomer includes a groove which is complimentary to the flange of the inner surface of the housing;
               the elastomer is permanently attached to at least a portion of the external surface of the inner sleeve;
               a portion of the elastomer is in contact with the internal surface of the housing; and
               the elastomer is not permanently attached to the internal surface.

2. The suspension link of claim 1, wherein the elastomer includes rubber.

3. The suspension link of claim 1, wherein the cross-sectional area of the first insert of the insert near the attachment point is smaller than the cross-sectional area of the first insert near the side opposite the attachment point.

4. The suspension link of claim 3, wherein the cross-sectional area of the second insert of the insert near the attachment point is smaller than the cross-sectional area of the second insert near the side opposite the attachment point.

5. The suspension link of claim 4, wherein the first insert and the second insert form a groove near the attachment point when attached to one another.

6. The suspension link of claim 1, wherein the channel is smooth.

7. The suspension link of claim 1, wherein the cavity includes:
   a first opening on a first end of the cavity; and
   a second opening on a second end of the cavity, wherein the second end is opposite the first end.

8. The suspension link of claim 7, wherein the cross-sectional area of the first opening is greater than the cross-sectional area of the cavity at the flange.

9. The suspension link of claim 8, wherein the cross-sectional area of the second opening is greater than the cross-sectional area of the cavity at the flange.

10. The suspension link of claim 1, wherein the attachment includes a threaded bolt.

11. The suspension link of claim 1, wherein the suspension link includes at least one of:
   a control arm;
   a track bar;
   a drag link; or
   a tie rod.

12. The suspension link of claim 1, wherein the screw drive includes a spanner head.

13. The suspension link of claim 1 further comprising:
   a second flexible joint, wherein the second flexible joint includes:
      a housing, wherein the housing includes:
         an external surface;
         an internal surface, the internal surface forming a cavity; and
         a flange on the internal surface; and
      an attachment, wherein the attachment:
         is connected to the external surface of the housing; and
         is configured to affix the second flexible joint to the body;
      wherein the second flexible joint is affixed to the body opposite the flexible joint; and
   a second joint insert, wherein the second joint insert:

is configured to be inserted in the housing of the second flexible joint; and includes:
- a first insert;
- a second insert attached to the first insert;
- an inner sleeve, wherein the inner sleeve includes:
  - a channel, wherein the channel is configured to receive at least a portion of a second external device; and
  - an external surface;
- an elastomer, wherein:
  - the elastomer includes a groove which is complimentary to the flange of the inner surface of the housing;
  - the elastomer is permanently attached to at least a portion of the external surface of the inner sleeve;
  - a portion of the elastomer is in contact with the internal surface of the housing of the second flexible joint; and
  - the elastomer is not permanently attached to the internal surface of the second flexible joint.

\* \* \* \* \*